(12) United States Patent
Chang

(10) Patent No.: US 9,794,448 B1
(45) Date of Patent: Oct. 17, 2017

(54) VISIBLE MULTIPLE CODES SYSTEM, METHOD AND APPARATUS

(76) Inventor: Hao-Jan Chang, San Jose, CA (US)

( * ) Notice: Subject to any disclaimer, the term of this patent is extended or adjusted under 35 U.S.C. 154(b) by 593 days.

(21) Appl. No.: 12/478,662

(22) Filed: Jun. 4, 2009

Related U.S. Application Data

(60) Provisional application No. 61/130,962, filed on Jun. 4, 2008.

(51) Int. Cl.
| | |
|---|---|
| *H04N 1/46* | (2006.01) |
| *B41J 2/21* | (2006.01) |
| *G06K 9/46* | (2006.01) |
| *H04N 1/405* | (2006.01) |
| *H04N 1/60* | (2006.01) |

(52) U.S. Cl.
CPC ............... *H04N 1/465* (2013.01); *B41J 2/21* (2013.01); *G06K 9/4652* (2013.01); *H04N 1/4057* (2013.01); *H04N 1/60* (2013.01)

(58) Field of Classification Search
USPC .................. 347/107, 224; 235/494; 360/131; 358/1.9; 356/402; 428/32.1; 382/232, 382/100; 380/210, 252, 287, 54; 713/176; 704/200.1, 273; 381/73.1; 348/460, 463
See application file for complete search history.

(56) References Cited

U.S. PATENT DOCUMENTS

| | | | | |
|---|---|---|---|---|
| 5,087,965 A | * | 2/1992 | Torre-Bueno ................. | 348/592 |
| 5,367,387 A | * | 11/1994 | Yamaguchi ................... | 358/518 |
| 5,369,261 A | * | 11/1994 | Shamir ......................... | 235/469 |
| 5,426,289 A | * | 6/1995 | Kinoshita et al. ............ | 235/469 |
| 5,576,528 A | * | 11/1996 | Chew et al. .................. | 235/469 |
| 5,845,013 A | * | 12/1998 | Bouchard et al. ............ | 382/242 |
| 5,869,828 A | * | 2/1999 | Braginsky ..................... | 235/469 |
| 6,070,805 A | * | 6/2000 | Kaufman ................. | G06K 7/14 |
| | | | | 235/462.04 |
| 6,239,795 B1 | * | 5/2001 | Ulrich et al. ................. | 715/866 |
| 6,445,835 B1 | * | 9/2002 | Qian ............................. | 382/306 |
| 6,567,560 B2 | * | 5/2003 | Kadono ........................ | 382/243 |
| 6,902,113 B2 | * | 6/2005 | Sali et al. ................ | 235/462.04 |
| 7,328,851 B1 | * | 2/2008 | Iftime et al. .................. | 235/494 |
| 7,770,803 B2 | * | 8/2010 | Onishi .......................... | 235/494 |
| 7,792,887 B1 | * | 9/2010 | Amirghodsi ................. | 382/165 |
| 8,488,193 B2 | * | 7/2013 | Greim ........................... | 358/1.9 |

(Continued)

FOREIGN PATENT DOCUMENTS

JP            2000123130 A * 4/2000

*Primary Examiner* — Stephen Meier
*Assistant Examiner* — John P Zimmermann
(74) *Attorney, Agent, or Firm* — Douglas L. Weller

(57) ABSTRACT

This invention refers to a data encoding system, a software basis, a data recording medium, a data read/write system, and methods and apparatus to make them thereof, all of which are based on a Multiple Codes System of more than two colors dots. The Multiple Codes system of more than two colors dots comprises more than two distinct colors as multiple codes for directly representing bits of bytes of data encoded by the system. The visible multiple colors may comprise bytes of data written in a software language for being read by an operating system or a program. The system also includes a bit/byte system with a format and rules of using a group of specific number of bits per byte including 8 bit/byte, 16 bit/byte, 32 bit/byte, 64 bit/byte, 128 bit/byte . . . or other higher numbers of bit/byte.

24 Claims, 6 Drawing Sheets

(56) References Cited

U.S. PATENT DOCUMENTS

| | | | |
|---|---|---|---|
| 2002/0066786 A1* | 6/2002 | Saito | 235/454 |
| 2004/0041026 A1* | 3/2004 | Tani | 235/454 |
| 2004/0246254 A1* | 12/2004 | Opstad et al. | 345/467 |
| 2005/0071295 A1* | 3/2005 | Cordery | G06Q 20/105 |
| | | | 705/405 |
| 2005/0150964 A1* | 7/2005 | Lo | 235/494 |
| 2005/0219568 A1* | 10/2005 | Kuroda | 358/1.9 |
| 2006/0039016 A1* | 2/2006 | Harrison, Jr. | G06K 19/06028 |
| | | | 358/1.9 |
| 2006/0104475 A1* | 5/2006 | Jancke | 382/100 |
| 2006/0182358 A1* | 8/2006 | Sekino et al. | 382/243 |
| 2006/0209326 A1* | 9/2006 | Higashiura | 358/1.9 |
| 2006/0214004 A1* | 9/2006 | Kubo et al. | 235/491 |
| 2007/0016700 A1* | 1/2007 | Kodaira | G06F 7/76 |
| | | | 710/52 |
| 2007/0125861 A1* | 6/2007 | Shoobridge | 235/462.04 |
| 2007/0291291 A1* | 12/2007 | Vilar et al. | 358/1.9 |
| 2008/0012850 A1* | 1/2008 | Keating, III | H04N 13/0207 |
| | | | 345/419 |
| 2008/0085058 A1* | 4/2008 | Cai et al. | 382/247 |
| 2008/0245861 A1* | 10/2008 | Fein et al. | 235/382 |
| 2009/0074309 A1* | 3/2009 | Cote | 382/233 |
| 2011/0049244 A1* | 3/2011 | Wang et al. | 235/470 |

\* cited by examiner

Encoded data

Example 1
Binary code of 1s & 0s       01001011        representation: K

Example 2
Color Based Binary Code     oooooooo        representation: K
                             rbrrbrbb Legend r: red
b: blue
o: color disposed on a substrate

*Fig. 1*

| | | |
|---|---|---|
| Example 3 | bgrw | ooooooo<br>bgwbggrw |
| Example 4 | cmyk | ooooooo<br>cmkcmmyk |
| Example 5 | bgyr | ooooooo<br>bgrbggyr |
| Example 6 | bgyr | ooooooooooooooo<br>bybybybygrgrgrgr |
| Example 7 | bgrcmy | ooooooo<br>bgrgymcy |
| Example 8 | vbgyBnr | ooooooooooooooo<br>gvbBnyrvbgrBngvybr |
| Example 9 | bgrGacmyBn | ooooooo<br>bgrGacmyBn |
| Example 10 | bgrGavmyBn | ooooooooooooooo<br>BvbvgmgmryryGaBnGaBn |

Legend

- r: red
- g: green
- b: blue
- w: white
- c: cyan
- y: yellow
- m: magenta
- k: black
- v: violet
- Bn: brown
- On: orange
- Ga: gray
- o: color shape or dot disposed on a substrate

*Fig. 2*

*Fig. 3*
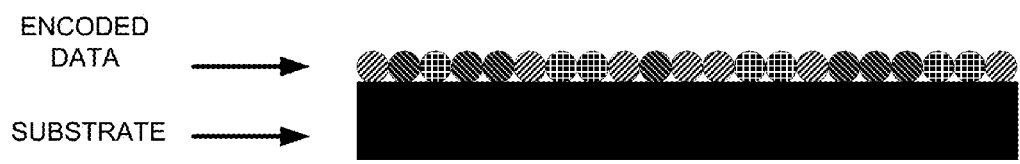
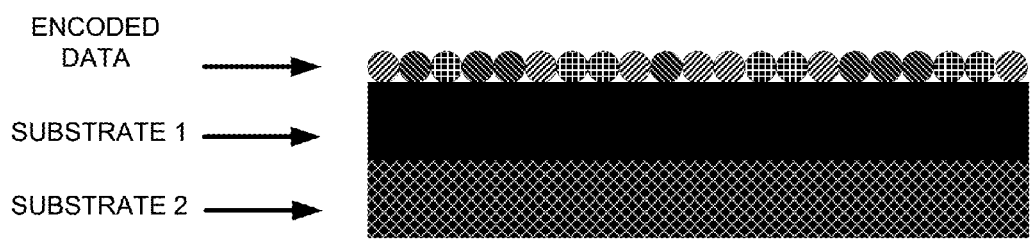
*Fig. 4*

*Fig. 5*
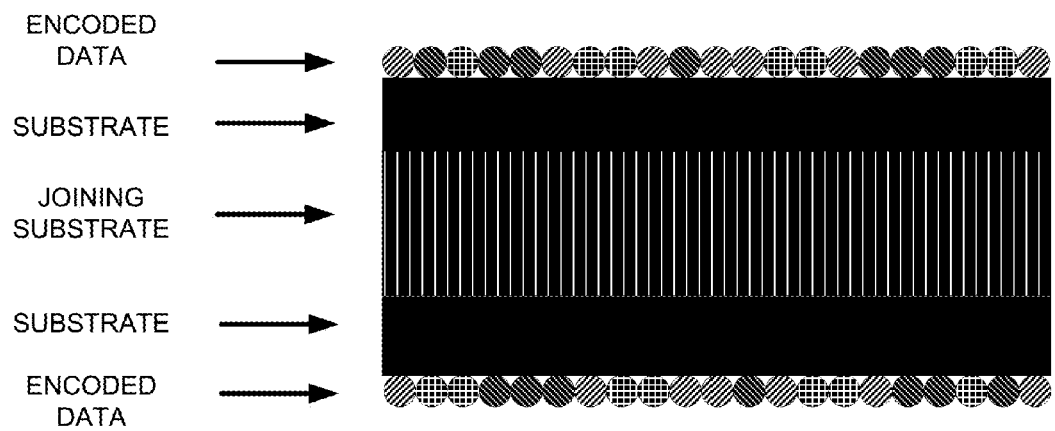
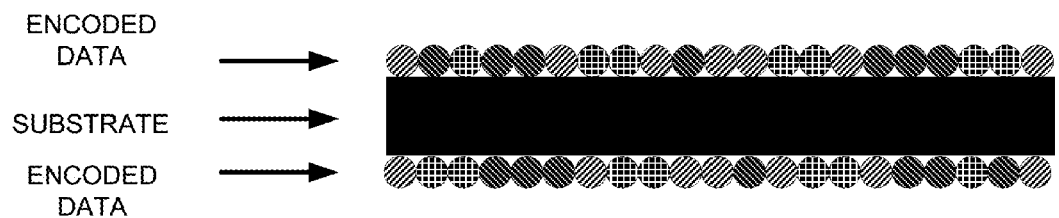
*Fig. 6*

VISIBLE MULTIPLE CODES SYSTEM, METHOD AND APPARATUS

CROSS-REFERENCES TO RELATED APPLICATIONS

This application claims priority from U.S. Provisional Application Ser. No. 61/130,962 filed Jun. 4, 2008 which is hereby incorporated herein by reference in its entirety.

TECHNICAL FIELD

The present invention relates to data encoding systems and methods, apparatus and products thereof.

BACKGROUND OF THE INVENTION

The subject invention relates to a new system, a visible multiple codes system. The current binary code system has been used since the dawn of computers and has had great uses. However, it does have limited capacity and drawbacks. It would be desirable to have a new system that can improve upon the current system in these respects, and can offer more capacity and capability in terms of better function and performance.

BRIEF SUMMARY OF EMBODIMENTS OF THE INVENTION

According to one variant of the invention, a Visible Multiple Codes (VMC) system is provided, for storing data on a machine readable medium. The system comprises at least two distinct colors formed in a shape and placed on the medium in a pattern based on the data which is encoded by the system. The colors are readable by a color discriminating apparatus. The system includes a module for correlating the pattern read by the color discriminating apparatus into the data represented by the pattern. The visible pattern comprises bytes of data written in a software language for being read by an operating system. In one embodiment, the shape of the distinct colors may comprise round, square, rectangular, triangular or star shapes. In another embodiment, the shape of the distinct colors may comprise colored dots.

In another variant of the VMC (visible multiple codes) system, the colors of the colored dots are selected from colors in the visible region of the electromagnetic spectrum, having wavelengths between 380 nanometers (nm) and 720 nm, wherein the colors comprise: red, green, blue, white, yellow, cyan, magenta, black, and other colors obtained from mixing two or more colors in various proportions.

In further variant of the VMC system, the colors are selected from a group of pairs comprising: red and blue, red and green, blue and green, red and white, blue and yellow, magenta and yellow, cyan and magenta, cyan and yellow, yellow and black, and other combinations of colors from the visible region of the electromagnetic spectrum, defined by wavelengths between 380 nm and 720 nm, and other colors obtained from mixing two or more colors in various proportions.

In yet another variant of the VMC system, the colors are selected from a group of a sets of colors comprising: a set of 3 distinct colors, a set of 4 distinct colors, a set of 5 distinct colors, a set of 6 distinct colors, a set of 7 distinct colors, and a set of 8 distinct colors. A set of 8 locations on the medium with each location having a specific color designation and may comprise a byte of 8 bits of information. The system comprises colors selected from only one of the sets. The colors of all the sets are selected from the visible region of the electromagnetic spectrum having wavelengths between 380 nm and 720 nm, and also comprises colors obtained from mixing two or more colors in various proportions.

In another variant of the VMC system, the colors are selected by electing a set from a group of sets of colors comprising: a set of 3 distinct colors, a set of 4 distinct colors, a set of 5 distinct colors, a set of 6 distinct colors, a set of 7 distinct colors, a set of 8 distinct colors; a set of 9 distinct colors; a set of 10 distinct colors; a set of 11 distinct colors; a set of 12 distinct colors; a set of 13 distinct colors; a set of 14 distinct colors; a set of 15 distinct colors; and a set of 16 distinct colors. A set of 16 consecutive locations on the medium, with each location having a color designation comprises a byte of 16 bits of information. The colors of all the sets are selected from the visible region of the electromagnetic spectrum having wavelengths between 380 nm and 720 nm, and also comprising colors obtained from mixing two or more colors in various proportions.

In a further variant of the VMC system, a set of consecutive locations on the medium, with each location having a color designation comprises a byte of information, wherein the number of locations in the set is selected from the group comprising: 16, 32, 64, and 128 locations. The colors of all the sets are selected from the visible region of the electromagnetic spectrum having wavelengths between 380 nm and 720 nm, and also comprising colors obtained from mixing two or more colors in various proportions.

In still another variant, a data read/write system is configured to read and write the encoded data of the VMC system. In another variant, a method of writing the encoded data produced by the VMC system is provided. The method comprises placing a plurality of visible colored shapes on a storage medium, in a pattern readable by the color discriminating apparatus and that can be correlated by the module for correlating the pattern. The visible colored shapes may be formed by a mechanism selected from a group comprising: an ink jet, a solid inking, dye sublimation process, thermal printing, laser printing, and impact printing.

In a variant of the method of writing the encoded data produced by the VMC system, the method may comprise exciting pre-coated layers, of which multiple layers containing color forming material with a light source. The color forming material responds to the light by producing color on the surface of the medium in the shape and color in accordance with the pre-programmed pattern.

In a further variant of the invention, a desk-top apparatus is configured for writing encoded data of the VMC system. In another variant, a desk-top reader may be configured for reading encoded data by the VMC system.

In still another variant, an electromechanical writing apparatus is configured to perform the steps of the method of writing the encoded data produced by the VMC system. The apparatus is configured to read the encoded data of the VMC system.

In yet a further variant, the electromechanical writing apparatus comprises a plurality of color delivering elements such as nozzles or apertures for writing the plurality of visible colored shapes in a bit-by-bit manner. A bit-by-bit manner comprises writing each bit before the next bit in the pattern is written. A bit comprises a single color shape, according to a pre-determined sequence and format.

In another variant of the electromechanical writing apparatus, the apparatus comprises a plurality of nozzles or apertures for writing the plurality of visible colored shapes. The apparatus is configured to write the encoded data in any of the following methods. One method may be in a bit-by-bit manner, where each bit is written before the next bit in the pattern is written. Another method is in a line-by-line manner, where a line of data is written before the next line in the pattern is written and each bit in the line is written simultaneously. A further method is in a block-by-block manner, where a block of data is written before the next block in the pattern is written and each bit in the block is written simultaneously. The apparatus comprises a plurality of nozzles or a plurality of apertures for writing the plurality of visible colored shapes on the medium.

In a further variant of the electromechanical writing apparatus, the apparatus comprises a plurality of columns and rows of write heads pre-arranged in matrix. The write heads are configured to apply a plurality of color shapes or color dots simultaneously on the medium according to a pre-determined sequence and format.

In still another variant of the electromechanical writing apparatus, the apparatus comprises a module for producing white or colored light beams. The apparatus is configured to excite pre-coated layers, of which multiple layers containing color forming material on the surface of the medium to form visible color shapes. The apparatus may also be configured to focus the light beam for varying the size of the color shape formed on the medium. The pattern of colored shapes comprises encoded data of the VMC system.

In yet a further variant of the electromechanical writing apparatus, the apparatus is configured to write data in a bit-by-bit manner, where each bit is written before the next bit in the pattern is written and a bit comprises a single color shape or single color dots. The apparatus is configured to select a source of light beams to excite the color forming material and the color forming material is from a group comprising: silver halides, dyes, pigments, and other ingredients.

In another variant of the electromechanical writing apparatus, the apparatus is configured to write a set of bits simultaneously to the medium. The module may be a micro light emitting device (LED) or a pixel sized fluorescent light.

In a further variant, of the electromechanical writing apparatus, the apparatus comprises a plurality of columns and rows of modules for producing white or colored light beams in a pre-arranged matrix. The modules are configured to excite pre-coated layers comprising multiple layers containing color forming material on the surface of the medium to form a plurality of color shapes or color dots simultaneously on the medium.

In still another variant, an electromechanical read apparatus is configured to emit color detecting beams for reading encoded data of the VMC system. The apparatus further comprises micro color sensors, for detecting a color property of the color shape or color dot in a portion of the medium read by the apparatus. In one embodiment, the micro color sensors are selected from the group comprising: a CCD (charge-coupled device), a CID (charge injected device), and a CMOS (complementary metal oxide semiconductor device). The color property that the color sensor is configured to detect is selected from the group comprising wavelength of light and frequency of light.

In yet a further variant, the electromechanical read apparatus is configured to read the data in at least one of the following methods. One may be in a bit-by-bit manner, where each bit is read before the next bit in the pattern is read according to a pre-determined sequence and format. A bit comprises a single color shape or a single color dot. Another method may be in a line-by-line manner, where a line of data is read before the next line in the pattern is read and each bit in the line is read simultaneously. A further method is in a block-by-block manner, where a block of data is read before the next block in the pattern is read and each bit in the block is read simultaneously.

In another variant, the electromechanical read apparatus comprises a plurality of columns and rows of modules for producing white or colored light beams in a pre-arranged matrix and is configured to read a plurality of color shapes simultaneously on the medium.

In a further variant of the electromechanical read apparatus, the pre-arranged matrix of modules comprises a plurality of color sensors pre-arranged in an ordered matrix, configured for reading a plurality of color shapes simultaneously. The apparatus reading can be accomplished without the motion of either the reading device or the medium.

In still another variant, the electromechanical read apparatus may further comprise a magnifier configured for increasing the viewing size of the color shapes of the encoded data for increasing the accuracy of the read apparatus in detecting the color shapes.

In yet a further variant, the electromechanical read apparatus is configured for scanning the color shapes and is configured for processing the data immediately or storing the scanned color shapes for processing later.

In another variant, the medium for storing the encoded data comprises a top protective layer disposed over all other layers of the medium. The top protective layer may comprise an ultra violet (UV) filter and an anti-scratch material.

In still a further variant, the medium comprises a substrate having a first side and second side. The colored shapes printed in a pattern on either or both sides of the medium. The medium may comprise a substrate having a color distinct from the colored shapes printed thereon. The colors are selected to allow the color discriminating apparatus to distinguish among all the colors.

In yet a further variant, the medium may comprising a plurality of layers comprising color forming materials excitable by light to form the color shapes.

In another variant, a data storage device contains encoded data formed in accordance with any embodiment described above and also has at least one other type of encoding medium that is not based on the VMC system.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1 is an illustration and comparison of examples of the traditional binary code based on 1s and 0s, and the Visible Multiple Codes system of two colors;

FIG. 2 illustrates examples of the Visible Multiple Codes system of three to eight color (codes) in accordance with the principles of the invention;

FIG. 3 is a cross-sectional view of an example medium for storing the encoded data on a single side of the medium, in accordance with the principles of the invention;

FIG. 4 is a cross-sectional view of an example medium having two different substrates for storing the encoded data on a single side of the medium, in accordance with the principles of the invention;

FIG. 5 is a cross-sectional view of an example medium having a joining substrate for joining two identical substrates for storing the encoded data on both sides of the medium, in accordance with the principles of the invention;

FIG. 6 is a cross-sectional view of an example medium having a single substrate for storing the encoded data on both sides of the medium, in accordance with the principles of the invention;

Figure 7:
FIG. 7 is a cross-sectional view of an example medium having two different substrates for storing the encoded data on a single side of the medium, wherein the medium is pre-coated with multiple layers of color forming materials, capable of generating a plurality of colors.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention relates to a Visible Multiple Codes system, a data and information encoding system, a data recording medium, a read/write system, and methods for implementing the system on hardware and media. The system may be implemented for computer software. In various embodiments, the present invention utilizes multiple visible color symbols, for example, small color dots may be used to represent bits of data in the encoding system. The visible color dots may be round, square, rectangular, triangle, star, or other suitable forms and shapes. The colored shapes may be referred to as dots or shapes interchangeably throughout this document. Preferably, the colored shapes are as small as practical for maximizing data storage capacity within the system.

In a variant, a single color shape is smaller than a pixel or sub-pixel so that a color sensing element is able to sense at least the size of one bit or several bits of a byte. The color of the color dot may be selected from colors with wavelengths in the visible region between 380 and 720 nanometers (nm). Visible colors may include red, green, blue, white, yellow, cyan, magenta, black, and other secondary colors obtained from mixing two or more colors with various proportions.

In another variant, a pair of different color dots is used as a visible multiple codes or visible binary code to replace the traditional binary code of 0s and 1s. The colors of the visible binary code may be selected from colors in the visible region between 380 and 720 nm. In one embodiment, the colors of the visible binary code may be selected from a group of pairs comprising: red-blue, red-green, blue-green, red-white, blue-yellow, magenta-yellow, cyan-magenta, cyan-yellow, yellow-black, and other combinations of colors from the visible region between 380 and 720 nm.

For example, if red and blue are selected as the colors of the visible binary code, red and blue dots serve as the bits in a byte (for example an 8 bit byte, a 16 bit byte, a 32 bit byte or other higher numbers bits bytes may be defined) of a software language encoded by the system. Referring to FIG. 1, an illustrative example is provided juxtaposing an 8 bit byte in the traditional binary code of 1s and 0s and a visible binary code in accordance with the present invention. In the visible code, the 8 bit byte is written in a visible binary code of two different color dots of red and blue.

In a further variant, the basic units of data comprise bits comprising a single color shape or a color dot. The bits may be grouped into bytes of data that represent language of a software application. The data encoding system, may comprise encoding data in more than two color dots. Embodiments may include 3, 4, 5 or any number of different color dots. In various embodiments 8 bits, 16 bits, 32 bits, or higher numbers of bits may define a byte. The colors for these different embodiments may be selected from colors in the visible region between 380 nm and 720 nm. For a VMC system of 4 color dots, examples of colors used by embodiments of the system may include blue-green-red-white, blue-green-yellow-red, cyan-magenta-yellow-black, or other combinations are selected from the visible region between 380 nm and 720 nm of the EM spectrum.

In still a further variant, the VMC system may comprise six different color dots. Embodiments may include blue-green-red-cyan-magenta-yellow, violet-blue-green-yellow-brown-red, or other combinations of six different colors are selected from the visible region between 380 nm and 720 nm. In yet a further variant, the VMC system may comprise eight different color dots. Embodiments may include redgreen-blue-white-cyan-magenta-yellow-black, red-green-blue-gray-cyan-magenta-yellow-brown, red-green-blue-magenta-violet-yellow-brown-gray, or other combinations are selected from the visible region between 380 nm and 720 nm. Similarly, variant having odd numbers of color dots are also selected from colors from the visible region between 380 nm and 720 nm. Some examples are illustrated in FIG. 2.

Conventional binary code of 1s and 0s, and the visible binary code would give about 256 possible representations for an 8 bits byte. However, the number of possible representations of a 4 color based system having 4 different colors dots described above would yield more than 65,000 representations, or about 250 times more than that of the binary code for an 8 bit byte. For a 16 bit byte, a visible code of 4 different color dots would yield more than 4 billion, or about 65,000 times more than that of the equivalent traditional binary code system. If a visible code of 6 different color dots are encoded for an 8 bit byte, the number of possible representations would be more than 1,600,000; if a visible code of 6 different color dots are encoded for a 16 bit byte, the number of possible representations would be more than 2 trillion. If a visible code of 8 different color dots are encoded for an 8 bit byte, the number of possible representations would be more than 16,000,000. If a visible based code of 8 different color dots are encoded for a 16 bit byte, the number of possible representations would be more than 200 trillions. Similarly, visible codes utilizing odd numbers of different colors dots, such as 3, 5, and 7 different colors dots, although not exemplified, would also give very significant large number of possible representations. The large number of possible representations mentioned above is one advantage of the VMC system.

In yet a further variant of the VMC system, a read/write apparatus is provided.

In another variant, writing encoded data in accordance with the principles of the invention may be accomplished either by placing the desired colors dots on the surface of an object or a substrate, or by exciting the dyes, pigments or other color forming material that are pre-coated on the substrate. In one embodiment, after the encoded data is written, a protective layer, for example, a piece of transparent material containing protective ingredients such as UV filter, the anti-scratch material, may be placed on top of all other layers for protection against possible damage caused by ultra violet (UV) light, scratches, and other harm.

In a further variant, writing the encoded data of the VMC system may be accomplished by placing color dots comprised of inks, dyes, or other colored materials on the surface of an object or substrate of a medium. The color dots may be written by selecting any of the following methods according to requirements of the circumstances. One is writing the encoded data bit-by-bit individually, another is in groups, for example, byte-by-byte, line-by-line, in multiple lines, or in blocks, or to write an entire designated data storage area of the substrate. In one embodiment, a disk or round shaped substrate may be written on with the encoded data in circle or worm-like pattern. In another embodiment a square or rectangular shaped substrate may have encoded data written on in a linear manner.

In one example, a rectangular sheet or a card type of substrate without pre-coated layers, the writing of encoded data may be accomplished by a transfer of either fine ink particles from an ink delivery element, or solid color dots to the substrate by dye sublimation or other means. In another example, ink jet printing may be chosen from among various printing methods. One optional variant includes using a single printing head containing multiple ink delivery elements (such as printing nozzles) to print at least one bit of encoded data at each delivery. In a further example, physical movement of writing bit-by-bit may be carried out by a single printing head moving horizontally while the substrate moves downward or upward during the printing process.

A second optional variant includes printing byte-by-byte, line by line, in multiple lines, or in blocks. A wider printing head than the previous example, with multiple ink delivery elements or columns and rows of multiple printing heads may be provided for printing an entire line, an entire width of the substrate, multiple lines, or a whole block.

A third optional variant may be provided for printing an entire designated data storage area simultaneously. Columns and rows of multiple printing heads may be provided to print the entire designated area at one time. This may be accomplished through a pre-set format or a template in which a plurality of printing heads are pre-arranged with the associated electronic controls in a matrix. The size of a byte, space in the margin, notations, and other rituals may be pre-arranged and pre-programmed, so that the only thing that needs to be provided prior to actual writing is the bit information such as the particular color for each bit (i.e. the color of the dot) and other possible changes for the pre-set format. In one embodiment, an entire area of encoded data may be written without moving either the substrate nor the writing assembly.

In still another variant, writing the encoded data may be carried about by exciting multiple layers in the medium containing Silver Halides, dyes, pigments or other color forming material pre-coated on the medium. Embodiments may include methods for carrying this out.

In one variant, a method includes writing the encoded data individually in a bit-by-bit manner with a white or colored light/laser beam. Another method may include writing the encoded data in groups, byte-by-byte, line-by-line, or block-by-block A white or colored light or laser beam may be used, or multiple micro light emitting devices (LEDs). Alternatively pixel sized fluorescent lights (e.g. red, green and blue in three cells or three sub-pixels but as one pixel, intensities of the three colors for example are controlled by a plasma or LCD to give a full range of colors), pre-arranged columns and rows or in a pre-set and pre-programmed template may be utilized.

Another method includes writing the encoded data in the entire designated data storage area with a screen or panel having a matrix of tiny colored fluorescent lights pre-arranged in rows and columns (like a pre-set template) and pre-programmed to give the desired pattern and format of colors dots for the encoded data.

The process of writing encoded data may include a process of placing appropriate inks, dyes, pigments, or other color forming material, in the form of small color dots, according to a pre-determined or pre-programmed sequence and pattern on the surface of a specific object, or on the surface of either side or both sides of a substrate. The substrate may be made from a mold or obtained from a large piece of material or a big roll of material cut into smaller pieces in the form of a disk, a card, a tape, a sheet, a page, a plate, or other shapes and forms.

In another variant, the substrate, may be rigid or flexible, and may be made from material selected from a group comprising: paper, cloth (woven or non-woven) or fibrous material, wood, resin (natural or synthetic), plastics, minerals, ceramics, glass, composites, metal, alloy, and other kinds of material. The substrate is optionally pre-treated or pre-coated for surface flatness and smoothness, for improving strength, and adhesion. In one embodiment, the substrate is pre-treated for determining a background color of the medium the color dots are printed on. In one example, the background color is selected from a group comprising: white, black, or other colors that are not in conflict or likely to cause a read apparatus to confuse the background color with a color in a pattern. For example, a substrate may be optionally pre-coated with multiple layers, some of which containing silver halides, dyes, pigments, or other color forming materials that are sensitive to and are excited by laser, white or colored light to create the appropriate color dots on the medium. The pre-treated or pre-coated substrate may optionally be placed (for example, adhered or laminated) onto another substrate of a different material that is more rigid or having other advantages than the first substrate, before or after the encoded data is provided on the substrate.

FIGS. 3-9 illustrate examples of cross-sectional side views of many types of general structures for carrying the encoded data in the form of color dots. For purposes of illustration, details such as color dots, overcoat, sub-coat, inter layers, barrier layers, dye developer layers, silver halide layers, binder, sensitizers, dye couplers, anti-halation layer, are not shown in the figures. FIGS. 3-9, include some examples with their encoded data (color dots) made from color inks, or dyes, by methods which may be selected from a group comprising: ink jet, laser jet, dye sublimation, and other printing methods. Some examples have encoded data (color dots) generated from dyes, pigments, or other color forming material of the multiple layers pre-coated on the substrates. Other examples are contemplated but are not shown.

Figure 8:
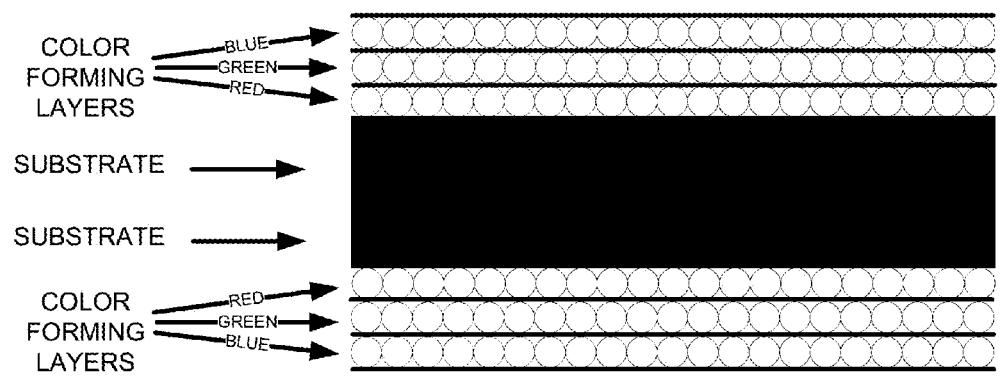
FIG. 8 is a cross-sectional view of an example medium having two identical substrates laminated back to back for storing the encoded data on both sides of the medium, wherein the medium is pre-coated with multiple layers of color forming materials on both sides, capable of generating a plurality of colors.
Figure 9:
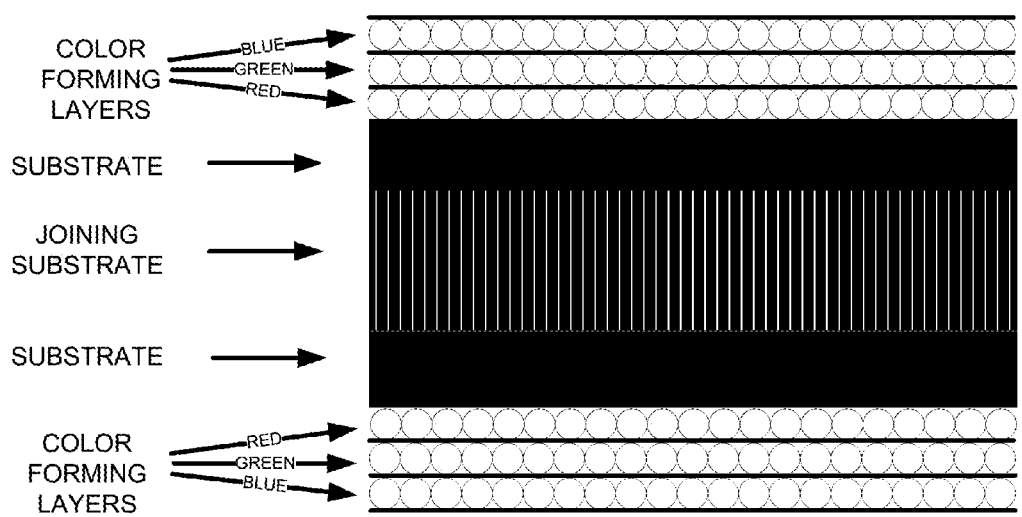
FIG. 9 is a cross-sectional view of an example medium having a joining substrate for joining two identical substrates for storing the encoded data on both sides of the medium, wherein the medium is pre-coated with multiple layers of color forming materials on both sides, capable of generating a plurality of colors.

FIGS. 3 and 4 illustrate media written on a single side. FIG. 4 illustrates one type of format that has a second substrate, on which the original substrate together with the encoded data is placed. FIGS. 5 and 6 illustrate media written on both sides of the media. FIG. 5 illustrates a one type of double sided media, formed by laminating two single sided mediums onto another substrate on the back of the two single sided mediums. FIG. 6 illustrates a type of format having encoded data on both sides of a single substrate. FIGS. 7, 8, and 9 illustrate pre-coated mediums with multiple layers of dyes, pigments or other color forming materials, capable of generating a full range of colors (they may be capable of providing multiple color dots of more than 3 colors dots, however only 3 colors are shown), when excited by white or colored light or laser light.

FIG. 7 illustrates a type of format comprising a single sided medium but has a second substrate on which the first substrate together with the encoded data is placed. FIG. 8 illustrates a type of format that comprises a double sided medium with two single sided mediums laminated back to back to form the double sided medium. FIG. 9 illustrates another type of format that comprises a double sided medium formed by laminating two single sided mediums onto a third substrate on the backs of the two single sided mediums.

In yet a further variant, reading the encoded data of the present invention may be accomplished by using any of the following methods. One method comprises reading the encoded data individually, bit-by-bit, by using a detector beam to detect the wavelength or frequency of light or color of each bit (each color dot). In a disk or a circular medium, the point of the detector beam may move in radial direction of the disk, while the medium that carries the encoded data being read rotates. In a square or rectangular type of medium that is soft or flexible, the medium moves linearly (upward or downward movement) while detector beam is moving horizontally (sideway).

Another method for reading the encoded data individually in a bit-by-bit manner comprises using a chip type small color sensor such as a charge-coupled device (CCD), charge injected device (CID), complementary metal oxide semiconductor device (CMOS), pixel, or other type of micro devices to detect the color information of the color dots.

A further method comprises reading the encoded data in groups (byte-by-byte, line-by-line, multiple lines, or block by block) by using multiple chips such as those mentioned above and also pre-arranged in columns and rows, in a matrix or in a template, according to pre-programmed sequence and format.

In yet another method for reading the encoded data is to use an electronic apparatus, a device or a machine equipped with many (for example millions or more) tiny color sensors pre-arranged in an ordered matrix. The apparatus may be configured for viewing, scanning or reading the entire encoded data area according to pre-programmed sequence and format. The more the number of tiny color sensors or pixels in a unit area, the higher the resolution. It is therefore possible to read the entire encoded data area on the surface of an object or on the surface of a substrate, without moving the medium or moving the reading apparatus as a whole.

Optionally, the apparatus include a magnifier for magnifying the encoded data. The magnifier may comprise a magnifying lens or other means to enlarge the viewing or reading size of the color dots prior to being read. Optionally, the encoded data may be read and processed instantly, or the encoded data may be read or scanned first and the data may then be stored for processing later. Magnifying the encoded data during reading of the encoded data of the VMC system by any micro devices, is equivalent to increasing the recording density (or capacity) of the media that carries the encoded data.

Advantages of the Invention

The VMC system provides a data unit that is visible and varies in color. As a consequence, the encoded data of the invention can be scanned, transferred, duplicated, down loaded or uploaded faster and easier than other systems.

There are several ways or methods to perform read/write operations for the described data encoding system. Some methods do not require the medium (a substrate on which data is written) to move during a read/write operation. One of the methods for carrying out the read/write operation functions with both the medium and the read/write head maintained in a stationary position, without motion like a rapid rotational movement by the medium and radial or arc movement by the head of a magnetic disk drive. This translates to easier assurance of proper functioning of the whole head/media system.

Unlike the requirements for some of the other media such as the traditional magnetic media and optical media like the CDs, DVDs, the requirements, such as surface smoothness, low head to media distance, for media of the VMC system of this invention is more forgiving; in addition, there are also a broader choice of materials for making the new media, all of these factors are leading to a low cost media for the new systems of this invention.

Embodiments of the system comprising more than two color dots, the system offers much higher recording capacity and provide more possible representations than the traditional binary code system for a particular unit of physical space. For example, a 16 bit byte in a 4 color dot based system is capable of offering about 4 billion possible representations, or 65,000 times higher than that of a binary code system. Therefore, the present invention represent more data in a given unit of space.

Data stored in media of the present invention is less vulnerable than that stored in traditional data storage media. For example, data stored in the present invention would not be susceptible to spurious magnetic fields.

Systems embodied by the present invention have multiple applications and uses. A group of new products may be generated from the present invention, some examples of which are listed below.

Type A:

Something written, spoken, printed, or recorded by statement, text, graphics, picture, film, photo, audio, video, or other means, that is encoded by or related to the multiple codes of color symbols such as multiple color dots, color shapes, described in this invention, including but not limited to, the following:

Computing or computer languages, software, programs, manuals, operating system, general languages such as English, French, German, Spanish, Portuguese, Latin, Russian, Chinese, Japanese, India languages, Arabic languages, and many other languages in the world; alphabets, letters, words, characters, phrases, sentences, symbols, signs, figures of all languages; and numbers, equations, physical constants, signs, symbols, variables, functions, marks, notes, punctuations, etc. in the fields of mathematics, science, engineering, art & literature, music, and other technical & non-technical fields in the world.

Type B:

Encoded data, information, documents, literatures, encyclopedias, dictionaries, books, publications, communications, letters, e-mails, web & internet related documents & correspondences, advertisements, passport (or pages of a passport), Permits, award & rewards; Currency, monetary denotations, checks (check book); Certificates, such as those for stock and bond; documents for shipping, mailing, pricing; etc. Ticket, such as those for: airline, buses, trains, boat, ship, toll, other transportation needs.

Type C:

Data or information recording mediums for data (information) memory or storage; Audio & video use such as movies, photos, songs, music; Driver's license, ID (personal identification) card, membership card, credit card, security card, entrance card, student card, business card, medical card, patient card, emergency card, insurance card, social security card, medicare card, welfare card, Medicaid card or medi-cal card, health card, library card, bank card, travel card, ATM card, telephone card, computer card, web card, e-card, internet card, data card, game card, meter card, shopping card, gift card, corporate employee card, governmental employee card, etc.

In a variant, the present invention provides a color based data encoding system, for storing data on a machine readable medium. In a variant, the system comprises at least two distinct colors formed in a shape and placed on the medium in a pattern based on the data which is encoded by the system. The colors are readable by a color discriminating apparatus. The system includes a module for correlating the pattern read by the color discriminating apparatus into the data represented by the pattern. The color based pattern comprises bytes of data written in a software language for being read by an computer operating system. In one embodiment, the shape of the distinct colors may comprise round, square, rectangular, triangular or star shapes. In another embodiment, the shape of the distinct colors may comprise colored dots.

In another variant of the color based data encoding system, the colors of the colored dots are selected from colors in the visible region of the electromagnetic spectrum, having wavelengths between 380 nanometers (nm) and 720 nm, wherein the colors comprise: red, green, blue, white, yellow, cyan, magenta, black, and other colors obtained from mixing two or more colors in various proportions. In further variant of the color based data encoding system, the colors are selected from a group of pairs comprising: red and blue, red and green, blue and green, red and white, blue and yellow, magenta and yellow, cyan and magenta, cyan and yellow, yellow and black, and other combinations of colors from the visible region of the electromagnetic spectrum, defined by wavelengths between 380 nm and 720 nm, and other colors obtained from mixing two or more colors in various proportions.

In yet another variant of the color based data encoding system the colors are selected from a group of a sets of colors comprising: a set of 3 distinct colors, a set of 4 distinct colors, a set of 5 distinct colors, a set of 6 distinct colors, a set of 7 distinct colors, and a set of 8 distinct colors. A set of 8 locations on the medium of which each location having a color designation may comprise a byte of 8 bits of information. The system comprises colors selected from only one of the sets. The colors of all the sets are selected from the visible region of the electromagnetic spectrum having wavelengths between 380 nm and 720 nm, and also comprises colors obtained from mixing two or more colors in various proportions.

In another variant of the color based data encoding system, the colors are selected by electing a set from a group of sets of colors comprising: a set of 3 distinct colors, a set of 4 distinct colors, a set of 5 distinct colors, a set of 6 distinct colors, a set of 7 distinct colors, a set of 8 distinct colors; a set of 9 distinct colors; a set of 10 distinct colors; a set of 11 distinct colors; a set of 12 distinct colors; a set of 13 distinct colors; a set of 14 distinct colors; a set of 15 distinct colors; and a set of 16 distinct colors. A set of 16 consecutive locations on the medium of which each location having a color designation comprises a byte of 16 bit of information. The colors of all the sets are selected from the visible region of the electromagnetic spectrum having wavelengths between 380 nm and 720 nm, and also comprising colors obtained from mixing two or more colors in various proportions.

In a further variant of the color based data encoding system, a set of consecutive locations on the medium having a color designation comprises a byte of information, wherein the number of locations in the set is selected from the group comprising: 16, 32, 64 and 128 locations. The colors of all the sets are selected from the visible region of the electromagnetic spectrum having wavelengths between 380 nm and 720 nm, and also comprising colors obtained from mixing two or more colors in various proportions. In still another variant, a data read/write system is configured to read and write data encoded by the color based data encoding system. In another variant, a method of writing the encoded data produced by the color based data encoding system is provided. The method comprises placing a plurality of visible colored shapes on a storage medium, in a pattern readable by the color discriminating apparatus and that can be correlated by the module for correlating the pattern. The visible colored shapes may be formed by a mechanism selected from a group comprising: an ink jet, a solid inking, dye sublimation process, thermal printing, laser printing, and impact printing.

In a variant of the method of writing the encoded data produced by the color based data encoding system, the method may comprise exciting pre-coated layers comprising multiple layers of color forming material with a light source. The color forming material responds to the light by producing color on the surface of the medium in the shape and color in accordance with the color based data encoding system.

In a further variant of the invention, a desk-top apparatus is configured for writing data encoded by the color based data encoding system. In another variant, a desk-top reader may be configured for reading data encoded by the color based data encoding system.

In still another variant, an electromechanical writing apparatus is configured to perform the steps of the method of writing the encoded data produced by the color based data encoding system. The apparatus is configured to read the data encoded by the color based data encoding system.

In yet a further variant, the electromechanical writing apparatus comprises a plurality of nozzles or apertures for writing the plurality of visible colored shapes in a bit-by-bit manner. A bit-by-bit manner comprises writing each bit before the next bit in the pattern is written. A bit comprises a single color shape, according to a pre-determined sequence and format.

In another variant of the electromechanical writing apparatus, the apparatus comprises a plurality of nozzles or apertures for writing the plurality of visible colored shapes. The apparatus is configured to write the encoded data in any of the following methods. One method may be in a bit-by-bit manner, where each bit is written before the next bit in the pattern is written. Another method is in a line-by-line manner, where a line of data is written before the next line in the pattern is written and each bit in the line is written simultaneously. A further method is in a block-by-block manner, where a block of data is written before the next block in the pattern is written and each bit in the block is written simultaneously. The apparatus comprises a plurality of nozzles or a plurality of apertures for writing the plurality of visible colored shapes on the medium.

In a further variant of the electromechanical writing apparatus, the apparatus comprises a plurality of columns and rows of write heads pre-arranged in matrix. The write heads are configured to apply a plurality of color shapes simultaneously on the medium according to a pre-determined sequence and format.

In still another variant of the electromechanical writing apparatus, the apparatus comprises a module for producing white or colored light beams. The apparatus is configured to excite pre-coated layers comprising multiple layers containing color forming material on the surface of the medium to form visible color shapes. The apparatus may also be configured to focus the light beam for varying the size of the color shape formed on the medium. The pattern of colored shapes comprises data encoded by the color based data encoding system.

In yet a further variant of the electromechanical writing apparatus, the apparatus is configured to write data in a bit-by-bit manner, where each bit is written before the next bit in the pattern is written and a bit comprises a single color shape. The apparatus is configured to select a source of light beams to excite the color forming material and the color forming material is selected from a group comprising: silver halides, dyes, and pigments.

In another variant of the electromechanical writing apparatus, the apparatus is configured to write a set of bits simultaneously to the medium. The module may be a micro light emitting device (LED) or a pixel sized fluorescent light.

In a further variant, of the electromechanical writing apparatus, the apparatus comprises a plurality of columns and rows of modules for producing white or colored light beams in a pre-arranged matrix. The modules are configured to excite pre-coated layers comprising multiple layers containing color forming material on the surface of the medium to form a plurality of color shapes simultaneously on the medium.

In still another variant, an electromechanical read apparatus is configured to emit color detecting beams for reading encoded data produced by the color based data encoding system. The apparatus further comprises micro color sensors, for detecting a color property of the color shape in a portion of the medium read by the apparatus. In one embodiment, the micro color sensors are selected from the group comprising: a CCD (charge-coupled device), a CID (charge injected device), and a CMOS (complementary metal oxide semiconductor device). The color property that the color sensor is configured to detect is selected from the group comprising wavelength of light and frequency of light.

In yet a further variant, the electromechanical read apparatus of is configured to read the data in at least one of the following methods. One may be in a bit-by-bit manner, where each bit is read before the next bit in the pattern which is read according to a pre-determined sequence and format. A bit comprises a single color shape. Another method may be in a line-by-line manner, where a line of data is read before the next line in the pattern is read and each bit in the line is read simultaneously. A further method is in a block-by-block manner, where a block of data is read before the next block in the pattern is read and each bit in the block is read simultaneously.

In another variant, the electromechanical read apparatus comprises a plurality of columns and rows of modules for producing white or colored light beams in a pre-arranged matrix and is configured to read a plurality of color shapes simultaneously on the medium.

In a further variant of the electromechanical read apparatus, the pre-arranged matrix of modules comprises a plurality of color sensors pre-arranged in an ordered matrix, configured for reading a plurality of color shapes simultaneously. The apparatus reading can be accomplished without the motion of either the reading device or the medium.

In still another variant, the electromechanical read apparatus may further comprise a magnifier configured for increasing the viewing size of the color shapes of the encoded data for increasing the accuracy of the read apparatus in detecting the color shapes. In yet a further variant, the electromechanical read apparatus is configured for scanning the color shapes and is configured for processing the data immediately or storing the scanned color shapes for processing later.

In another variant, the medium for storing the encoded data comprises a top protective layer disposed over all other layers of the medium. The top protective layer may comprise an ultra violet (UV) filter and an anti-scratch material.

In still a further variant, the medium comprises a substrate having a first side and second side. The colored shapes printed in a pattern on either or both sides of the medium. The medium may comprise a substrate having a color distinct from the colored shapes printed thereon. The colors are selected to allow the color discriminating apparatus to distinguish among all the colors.

In yet a further variant, the medium may comprise a plurality of layers comprising color forming materials excitable by light to form the color shapes.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. In addition, when a single callout line in the drawings leads to two or more separate reference numbers (first, second, etc. reference numbers), (and each reference numeral refers to a different piece of text in the detailed description) and it would be inconsistent to designate the drawing item being called out as both pieces of text, the drawing be interpreted as illustrating two different variants. In one variant, the drawing item is referred to by the first reference number and in another variant the drawing item is referred to by the second reference number, etc.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether CTRL logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for reading data stored on a medium, the method comprising the steps of:
   reading single color star-shaped dots of data individually, dot-by-dot, including:
      using a detector beam to detect wavelength or frequency of light for each single color star-shaped dot of data on the medium, wherein each single color star-shaped dot is a solid color dot without outlines and without background frame regions, and
      assigning a value to each single color star-shaped dot based on detected wavelength, wherein the valued assigned to a single color star-shaped dot is based on the detected wavelength and there are at least three possible values based on wavelength that can be assigned to each single color star-shaped dot of data.

2. A method as in claim 1, wherein the medium is a disk and using the detector beam to detect wavelength or frequency of light for each single color star-shaped dot of data on the medium includes:
   rotating the disk in a circular movement, and
   moving the detector beam in a radial direction with respect to the disk in order to locate the detector beam at each dot location on the medium.

3. A method as in claim 1, wherein the medium is rectangular and using the detector beam to detect wavelength or frequency of light for each single color star-shaped dot of data on the medium includes:
   moving the medium in a first direction, and
   moving the detector beam in a second direction perpendicular to the first direction in order to locate the detector beam at each single color star-shaped dot location on the medium.

4. A method as in claim 1, wherein different colors of the single color star-shaped dots are selected from colors in the visible region of the electromagnetic spectrum, having wavelengths between 380 nanometers (nm) and 720 nm.

5. A method as in claim 1, wherein different colors of the single color star-shaped dots each comprise one of the following colors: red, green, blue, white, yellow, cyan, magenta, black or a combination thereof.

6. A method as in claim 1, wherein each single color star-shaped dot has four possible values represented by four different colors.

7. A method as in claim 1, wherein each single color star-shaped dot has five possible values represented by five different colors.

8. A method as in claim 1, wherein each single color star-shaped has six possible values represented by six different colors.

9. A method as in claim 1, wherein each single color star-shaped has seven possible values represented by seven different colors.

10. A method as in claim 1, wherein each single color star-shaped has eight possible values represented by eight different colors.

11. A method as in claim 1, wherein each single color star-shaped dot has more than eight possible values represented by more than eight different colors.

12. A method for reading data stored on a medium, the method comprising the steps of:
   reading single color star-shaped dots of data in groups of dots, each group being a subset, but not all of single color star-shaped dots on the medium, including:
      using a detection that simultaneously detects wavelength or frequency of light for each single color star-shaped dot of data in a group of single color star-shaped dots, as the groups of single color star-shaped dots are detected one group at a time, wherein each single color star-shaped dot is a solid color dot without outlines and without background frame regions, and
      assigning a value to each single color star-shaped dot in a group based on detected wavelength for single color star-shaped dots in the group, wherein the valued assigned to a single color star-shaped dot is based on the detected wavelength and there are at least three possible values based on wavelength that can be assigned to each single color star-shaped dot of data.

13. A method as in claim 12, wherein each group is eight single color star-shaped dots of data.

14. A method as in claim 12, wherein the medium is rectangular and each group is a line of single color star-shaped dots across the medium.

15. A method as in claim 12, wherein the medium is rectangular and each group is a plurality of lines of single color star-shaped dots across the medium.

16. A method as in claim 12, wherein the medium is rectangular and each group is a subset of a line of single color star-shaped dots across the medium.

17. A method as in claim 12, wherein different colors of the single color star-shaped dots are selected from colors in the visible region of the electromagnetic spectrum, having wavelengths between 380 nanometers (nm) and 720 nm.

18. A method as in claim 12, wherein different colors of the single color star-shaped dots each comprise one of the following colors: red, green, blue, white, yellow, cyan, magenta, black or a combination thereof.

19. A method as in claim 12, wherein each single color star-shaped dot has four possible values represented by four different colors.

20. A method as in claim 12, wherein each single color star-shaped dot has five possible values represented by five different colors.

21. A method as in claim 12, wherein each single color star-shaped dot has six possible values represented by six different colors.

22. A method as in claim 1, wherein each single color star-shaped dot has seven possible values represented by seven different colors.

23. A method as in claim 12, wherein each single color star-shaped dot has eight possible values represented by eight different colors.

24. A method as in claim 12, wherein each single color star-shaped dot has more than eight possible values represented by more than eight different colors.

* * * * *